(12) United States Patent
Lundh

(10) Patent No.: US 6,373,819 B1
(45) Date of Patent: Apr. 16, 2002

(54) ROUTINE TESTING PARITY MAINTENANCE

(75) Inventor: Peter Carl Birger Lundh, Skärholmen (SE)

(73) Assignee: Telefonaktiebolaget L M Ericsson(publ), Stockholm (SE)

( * ) Notice: Subject to any disclaimer, the term of this patent is extended or adjusted under 35 U.S.C. 154(b) by 0 days.

(21) Appl. No.: 09/104,329

(22) Filed: Jun. 25, 1998

Related U.S. Application Data

(63) Continuation of application No. PCT/SE96/01725, filed on Dec. 20, 1996.

(30) Foreign Application Priority Data

Dec. 29, 1995 (SE) .............................................. 9504708

(51) Int. Cl.⁷ ............................................ G01R 31/08
(52) U.S. Cl. ...................................... 370/244; 370/248
(58) Field of Search ................................ 370/242, 244, 370/241, 248, 250; 714/738, 800, 25, 48, 739, 803

(56) References Cited

U.S. PATENT DOCUMENTS

| | | | |
|---|---|---|---|
| 4,393,490 A | 7/1983 | Culley | |
| 4,485,467 A | 11/1984 | Miles et al. | |
| 4,532,624 A | 7/1985 | Renner | |
| 4,546,475 A | 10/1985 | Sharpless et al. | |
| 4,821,256 A | 4/1989 | Schmidt et al. | |
| 5,367,395 A | * 11/1994 | Yajima et al. | ............... 395/110 |
| 5,455,832 A | * 10/1995 | Bowmaster | ................ 371/20.1 |
| 5,668,801 A | * 9/1997 | Grunenfelder | ............... 370/253 |
| 5,910,977 A | * 6/1999 | Torregrossa | ................ 370/251 |

FOREIGN PATENT DOCUMENTS

| | | |
|---|---|---|
| WO | 83/04355 | 12/1983 |
| WO | 9713390 | 6/1998 |

* cited by examiner

*Primary Examiner*—Hassan Kizou
*Assistant Examiner*—Thien Tran
(74) *Attorney, Agent, or Firm*—Burns, Doane, Swecker & Mathis, L.L.P.

(57) ABSTRACT

A system for detecting faults in fault detecting hardware designed to detect faults in a data flow comprising a fault generator for deliberately introducing faults in the data flow before it reaches the fault detecting hardware to establish a known background load of faults in the data flow. A fault counter counts actual faults including the deliberately introduced faults. Software analyzes a difference between the known and actual loads of faults.

13 Claims, 4 Drawing Sheets

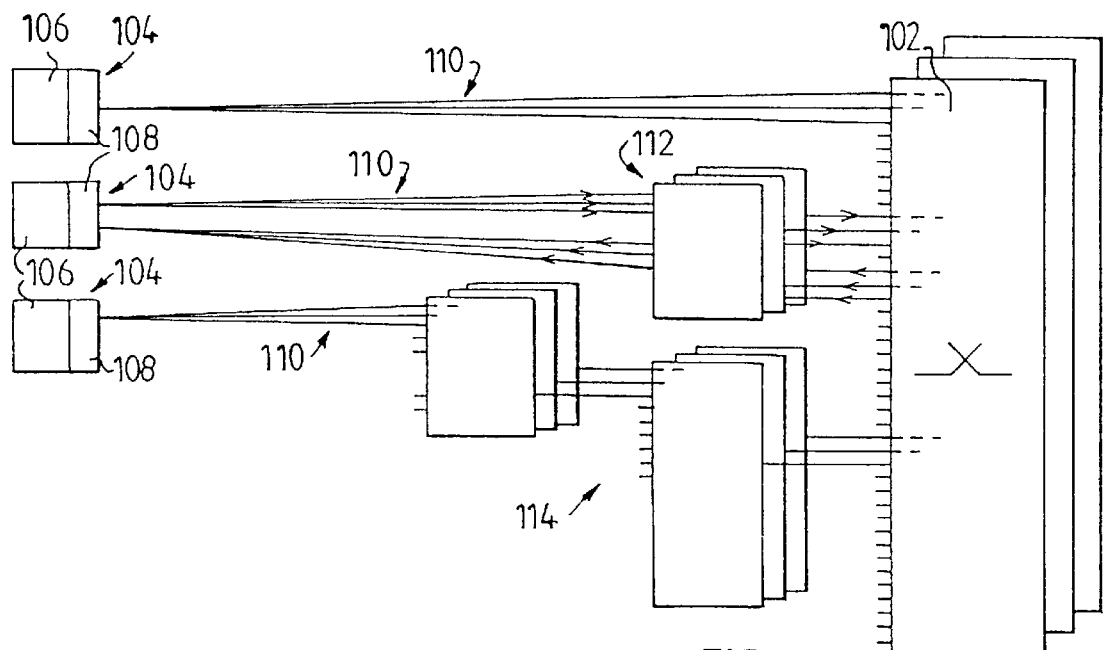
FIG.1
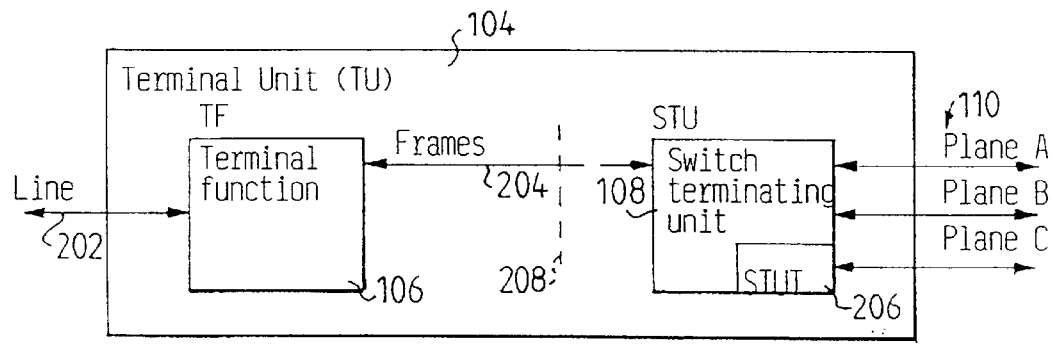
FIG.2
| Parity faults found in frame | Feed back in time slot: | Number of parity faults found in a frame (125 μs) and the value put in the time slots MFPE; | | |
|---|---|---|---|---|
| | | No parity faults: | One parity fault: | Two or more: |
| LX | MFPE_XL | Always $00_{16}$ | | |
| XL | MFPE_LX | $00_{16}$ | $01_{16}$ | $FF_{16}$ |
FIG.4

ROUTINE TESTING PARITY MAINTENANCE

This application is a continuation of International Application No. PCT/SE96/01725, which was filed on Dec. 20, 1996, which designated the United States, and which is expressly incorporated here by reference.

BACKGROUND

The present invention according to a first aspect relates to a terminal unit for a TS switch, said terminal unit comprising a terminal function forming a user part of the terminal unit, and a switch terminating unit forming a switch port, there being bidirectional transfer of signals, including parity supervised signals, between the terminal function and the switch terminating unit, said signals being organized in frames containing a number of time slots.

According to a second aspect the invention relates to a method and a system for detecting faults in fault detecting hardware designed to detect faults in a data flow.

U.S. Pat. No. 4,532,624 describes parity testing in a telecommunication system. Parity errors are collected in common and erroneous parity may be generated to the different parity circuits, one at a time, for deciding from where the parity error originated.

U.S. Pat. No. 4,485,467 describes a digital switch matrix with built-in diagnostic functions, comprising parity checking and verifying parity checking, the latter consisting in forcing a predetermined data with even parity to test the parity checking circuit.

U.S. Pat. No. 4,821,256 discloses priority testing of a switch network. When a parity error has been found in one transmission direction, the parity bit created for transmission in the other transmission direction is made erroneous. If the other side sets the parity bit to the wrong level, it is however not described how it would be possible to establish where in the near end the error is located.

U.S. Pat. No. 4,393,490 discloses fault identification in a TS switch for detecting bad parity. The switch has a redundancy structure consisting of two planes. An alternative pattern is made to replace a pattern with erroneous parity. The part terminating the two planes detects this alternative pattern and replaces it by data from the other plane.

In WO 83/04355 parity is used for supervising time slots. An established connection is checked by generating erroneous parity and detecting where they appear.

SUMMARY

In a system according to the first aspect of the invention as indicated by way of introduction, maintenance is important to enabling identification of the nature and location of faults. There is also a need of having overlapping supervision functions to be able to cover all faults. It is also desirable to make such functions autonomous in hardware with the analyzing part in software to avoid obtaining status "OK" due to a fault in the hardware.

It is an object of the invention to realize such an overlapping supervision in a terminal unit of the kind indicated.

According to the invention there is, in this terminal unit, a first parity fault generating means in the switch terminating unit for generating in a test time slot (MFPE), included in said number of time slots and intended for parity function routine tests, a parity fault in a determined one of the frames sent to the terminal function. This produces an expected number of faults in the frames sent to the terminal function.

A second parity fault generating means in the terminal function generates a parity fault in the test time slot in a determined one of the frames sent to the switch terminating unit. This produces an expected number of faults in the frames sent to the switch terminating unit. The terminal function furthermore comprises a first time slot counting means for counting time slots with parity error in the frames received from the switch terminating unit, and producing a result for each frame indicative of the number of parity errors of that frame. Means are provided for inserting each result indicative of the number of parity errors in a first available one of the test time slots in the frames sent to the switch terminating unit. The switch terminating unit furthermore comprises a second time slot counting means for counting time slots with parity error in the frames received from the terminal function and producing a result for each frame indicative of the number of parity errors for that frame. Parity fault monitoring functionality receives the result produced by the first time slot counting function and transferred in the test time slot, and the signal from the second time slot counting means indicative of test time slots appearing in the determined frame. Software associated with the monitoring functionality produces a result which is indicative of the number of parity faults received in test time slots minus the expected number of faults in the determined frames sent to the switch terminating unit.

Generally, and referring to the second aspect of the invention, to be able to detect and localize hardware faults in large systems, such as a telephony switch, there has to be functions in the hardware that can detect these faults. The functions can for example be implemented as parity checkers, checksums or comparison of data in redundant synchronous data flows, etc.

When a fault is found by some hardware, a flag is set or a counter is incremented. The flag or counter can then be read by software and further analysis can be made to localize the fault.

To be able to detect all faults in the hardware, it is a desire to be able to detect faults in the fault detection hardware, like the parity checkers and counters. Otherwise there might be a fault in a counter (e.g. it is stuck to 0) which is not detected since the software assumes that everything is correct as long as the value is 0.

It is a further object of the invention to provide, in accordance with the second aspect, a method and a system able to fulfil the above mentioned desire without disturbing the system in any way.

To attain this object the method according to the invention for detecting faults in fault detecting hardware designed to detect faults in a data flow, comprises the steps of introducing a known background load of faults in data flow, detecting actual background load of faults, and detecting a difference between the known and actual loads of faults.

The system according to the invention for detecting faults in fault detecting hardware designed to detect faults in a data flow comprises fault generating means for deliberately introducing faults in the data flow before it reaches the fault detecting hardware to obtain a known background load of faults in the data flow, fault counting means for counting actual faults including the deliberately introduced faults for detecting actual background load of faults, and software means for detecting a difference between the known and actual loads of faults.

The invention thus presents a solution on how to test fault detection hardware in a non intrusive way.

The way to accomplish this is by introducing such faults that the fault detection hardware will recognize these and count them, but the introduced faults must not in any way disturb the system. The software that is responsible for reading these counters, knows what the 'background load' of detected faults shall be. For approval the resulting value should be equal to the 'background load'. If it is less or greater there is a fault.

By means of this principle, it is possible to find 'normal' faults, i.e. faults that the fault detection mechanism was supposed to detect. It is also possible to detect faults in the fault detection hardware and in the fault generating hardware.

BRIEF DESCRIPTION OF THE DRAWINGS

The invention will now be described more closely below with reference to the drawings, in which FIG. 1 is a view schematically illustrating connection of terminal units of a TS switch, FIG. 2 is a schematic view of a terminal unit of the kind included in FIG. 1, FIG. 4 is a table showing the connection between different numbers of parity errors appearing in some frames in FIG. 3 and a way of coding these numbers.

DETAILED DESCRIPTION

Figure 3:
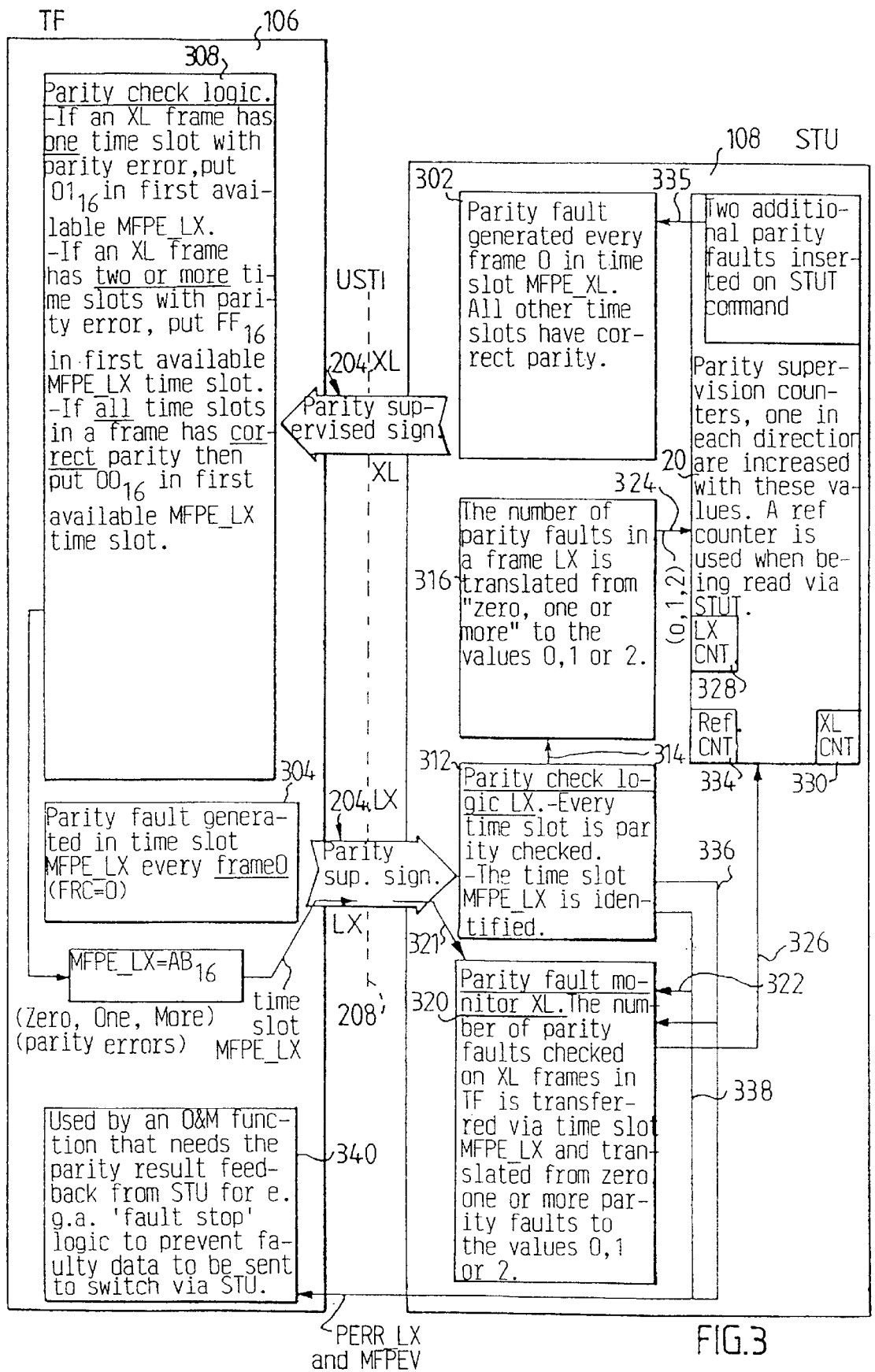
FIG. 3 is a block diagram schematically illustrating flows of signals and frames in an embodiment of a terminal unit according to FIG. 2, including a first embodiment of routine test of maintenance hardware.

In FIG. 1 a block 102 indicates a switch core which can e.g. have a so-called time/space structure. The dataflow through the switch is organized in frames containing a number of time slots, including data time slots.

To the switch core 102 a number of terminal units TU, indicated by blocks 104, are two-way connected to the core 102. Each terminal unit 104 is schematically indicated to include a terminal function TF 106 forming a user part of the terminal unit 104, and a switch terminating unit STU 108 forming a switch port.

Between the terminal units and the switch core 102 links 110 extend. The links 110 can extend directly to the switch core, or via one or more multiplexor/demultiplexor steps, indicated at 112 and 114, respectively. Below, these multiplexor/demultiplexor steps may also be referred to as terminal connection units TCU.

By means of the terminal connection units TCU many devices with varying bandwidth requirements can be connected to the switch core 102. More particularly, the multiplexor part of a terminal connection unit TCU performs mapping of data time slots to the links towards the switch core 102, and speed transformation between incoming links 110 with different classes of speed. All data time slots coming from the switch core 102 shall be sent further towards the devices in a certain order. This order can be determined by mapping memories in the demultiplexor part of a terminal connection unit, i.e. the demultiplexing can be controllable. Information regarding how to perform it will be loaded into the mapping memories.

In FIG. 1 there is also indicated that there can be a redundancy structure by illustrating each link 110, multiplexor/demultiplexor step 112/114 and the switch core 102 as being triplicated with three redundancy planes A, B and C.

For further details of a structure of the kind indicated in FIG. 1 reference can e.g. be made to Swedish patent application 9503421-1 (EUA 494). No further explanation should therefore be needed here.

FIG. 2 schematically illustrates a terminal unit TU in some more detail, the terminal function TF and the switch terminating unit STU being indicated by the same reference numerals as in FIG. 1. The switch terminating unit 108, logically belonging to the switch, terminates the triplication and is responsible for certain maintenance functions belonging to the switch. A double arrow 202 indicates bidirectional data transfer lines from users, ending in the terminal function 106, and a double arrow 204 indicates bidirectional transfer of signals organized in frames including time slots between the terminal function 106 and the switch terminating unit 206. Some of these signals are parity supervised.

In the switch terminating unit 108 a block 206 indicates a function for handling operation and maintenance of the switch terminating unit 108. This circuit function will also be referred to below as switch terminating unit terminal STUT.

Communication between the terminal function 106 and switch terminating unit 108 is performed via a switch terminal interface 208, below also referred to as interface USTI. The switch terminal interface USTI is used for user data and for controlling the switch and is a frame based parallel interface. The frames of the frame structure can here be assumed, as an example, to have a frame length of 125 $\mu$s with 1280 or 2560 time slots.

The time slots of the frame formats used for the switch terminal interface USTI are here assumed to include maintenance time slots. As an example, it will furthermore be assumed below that the flow of frames through the switch is divided into a number of frame groups forming a multiframe, including 8000 frames, thus corresponding to a multiframe length of 1 s. As appears from the above mentioned Swedish patent application No. 9503421-1 (EUA 494), it will furthermore be assumed that each frame in the multiframe has a unique code, the value of which is used for identifying the frames in a multiframe, this value being referred to below as the FRC value (FRame Counter).

In a system of the kind superficially described above with reference to FIGS. 1 and 2 maintenance is important for being able to trace faults. One important way of providing this is by using autonomous overlapping supervision functions to cover all faults, as will be described below.

The switch terminal interface USTI is parity checked and contains a number of signals among which are signals used for parity and parity acknowledge. One of these signals will be referred to below as parity signal PERR_LX for Parity ERRor LX, where LX stands for direction towards switch. The other one of the signals will be referred to as signal MFPEV, for Multi Frame Parity Error Valid, where Valid stands for indicating that the parity check relates to a test time slot MFPE. The purpose and use of these signals as well as the test time slot MFPE will appear in more detail below.

There is a dedicated time slot used for routine test of the parity functions in both directions. This time slot will be called MFPE (Multi Frame Parity Error) below. The time slot MFPE has two functions. One is to insert parity faults and one is to feed back parity check results from the terminal function 106 to the switch terminating unit 108.

For identifying direction of flows through a terminal unit 104 the suffixes LX and XL will be used below for indicating direction to and from the switch, respectively, cf. also as an example the signal PERR_LX mentioned above.

In FIG. 3 the mutual exchange of parity supervised signals between the terminal function 106 and the switch terminating unit 108 is indicated by 204.XL for the direction towards the terminal function 106 and by 204.LX for the direction towards the switch terminating unit 108.

The terminal unit 104 comprises a first parity fault generating function in the switch terminating unit 108 for generating a parity fault in a test time slot, used for parity function routine tests, in a determined frame for producing an expected number of faults or, in other words, a known background load of faults, in the parity supervised signals 204.XL sent to the terminal function 106. The determined frame is one of the 8000 frames of each a length of 125 $\mu$s of a multiframe sent to the terminal function 106. Accordingly, the determined frame and thus the test time slot appears once each second.

More particularly, in the example to be discussed further below, the switch terminating unit 108 has a parity fault generator 302 generating a parity fault for every frame in the signals 204.XL having a determined FRC-value in time slot MFPE_XL. With further reference to the above mentioned Swedish patent application No. 9503421-1 (EUA 494), this value will here be referred to as FRC value 0, and a frame having this value will be referred to as frame 0. All other time slots in a multiframe should have correct parity. The parity fault is generated by means of inverting a parity signal PAR_XL of the interface USTI 208. An exception from the condition that the parity should be correct for all other time slots in a multi frame will appear when another two parity faults are ordered in the switch terminating unit in another frame than the determined frame, for the purpose of testing counters, as will be described further below.

The terminal unit 104 furthermore comprises a second parity fault generating function in the terminal function 106 for generating a parity fault in the test time slot in a determined one of the frames sent to the switch terminating unit 108. This produces an expected number of faults or, in other words, a known background load of faults, in the parity supervised signals 204.LX, in the same way as described above for the signals 204.XL. More particularly, in the example discussed, the terminal function 106 has a parity fault generator 304 generating a parity fault in time slot MFPE_LX in the signals 204.LX in every frame 0. All other time slots in these frames and all other frames should have time slots with correct parity.

The terminal function 106 furthermore comprises a counter for counting time slots with parity error in the frames received from the switch terminating unit 108, and producing a result for each frame indicative of the number of parity errors of that frame. Means are also included in the terminal function 106 for inserting each such result indicative of the number of parity errors in a first available one of the test time slots, i.e. time slots MFPE, in the frames sent to the switch terminating unit 108. More particularly, in the example shown, a parity error counting function 308 in the terminal function 106 counts time slots with parity error received in parity supervised signals 204.XL and also has logic for producing a parity error number indicating result. This logic works as follows:

If a frame XL has one time slot with parity error then put $01_{16}$ in first available MFPE_LX.

If a frame XL has two or more time slots with parity error then put $FF_{16}$ in MFPE_LX in first available MFPE_LX.

If all time slots in a frame has correct parity then put $00_{16}$ in first available MFPE_LX.

The above mentioned values to be put into a first available MFPE_LX are hexadecimal values.

Thus, as indicated above, a first available time slot MFPE_LX in the frames of the flow of parity supervised signals 204.LX is used as a feedback to the switch terminating unit STU 108 of the result from the parity check done in the function 308.

As for the terminal function 106, also the switch terminating unit 108 comprises a counter for counting time slots with parity error in the frames received from the terminal function 106 and producing a result for each frame indicative of the number of parity errors for that frame. The switch terminating unit 108 also includes means for identifying a test time slot, i.e. MFPE, appearing in the determined frame, i.e. frame 0 and producing the signal MFPEV mentioned above as indicative of the test time slot. More particularly, a parity error counting function 312 in the switch terminating unit 108 counts time slots with parity error, received in the parity supervised signals 204.LX, and indicates when the time slot MFPE_LX appears in a frame having the FRC value 0. The counting result is sent, indicated by arrow 314, to a translation function 316 in the switch terminating unit STU 108 for translating the number of parity faults in a frame LX from zero, one or more to the numbers 0, 1 and 2.

There is also parity fault monitoring functionality in the switch terminating unit 108 receiving the result produced by the counter for counting time slots with parity error in the terminal function 106 and transferred in the test time slots. This monitoring functionality also receives the signal indicative of test time slots appearing in the determined frame, and produces a result indicative of the number of parity faults received in test time slots minus the expected number of faults appearing in the determined frames sent to the switch terminating unit.

More particularly, in the example shown, the switch terminating unit STU 108 has a parity fault monitor 320, to which the number of parity faults checked by the function 308 for XL frames in the terminal function TF is transferred via the time slot MFPE_LX, indicated by arrow 321. The parity fault monitor 320 also receives a signal, indicated by arrow 322, from the function 312, for indicating when the time slot MFPE_LX appears in a frame having the FRC value 0. Software associated with the parity fault monitor 320 produces a result indicative of the number of parity faults received in test time slots MFPE_LX minus the expected number of faults in frames 0 sent to the switch terminating unit and consisting of the numbers 0, 1 or 2 for zero, one or more parity faults, respectively.

The values obtained from the translation function 316 and from the parity fault monitor 320 in the switch terminating unit STU are transferred, indicated by arrows 324 and 326, respectively, to two parity supervision counters in the STUT function 206, one counter 328 for the LX direction and one counter 330 for the XL direction. The function STUT also includes a reference counter 334.

The counters 328 and 330 are incremented with the respective values and can e.g. be read by a computer, not shown, at the end of determined spaces of time, e.g. every five minutes. The counters will then be designed not to reach their top values within the determined space of time. If they do, an alarm is caused by the switch terminating unit.

From the above it has appeared that if a frame (125 $\mu$s) contains one or more parity faults then the time slot MFPE gets the value $01_{16}$ or $FF_{16}$, respectively, and if every time slot in a frame has correct parity the MFPE gets the value $00_{16}$. FIG. 4 shows a table indicating the number of parity faults found in a frame and the corresponding feed back values. As can be seen in this table, time slots MFPE_XL do always contain $00_{16}$. The parity supervision counters represented by the block in the switch terminating unit STU 108 count zero, one or more parity faults discovered by the logic 308 in the terminal function TF sent to the switch terminating unit STU as zero, one or two increments, respectively, in the respective counter. This means that the parity routine test and its corresponding logic works properly when the counters increment one step each second.

For routine test of the parity check logic 308 in the terminal function TF, the STUT function 206 also includes a command function for commanding, indicated by arrow 335, the parity fault generator 302 to introduce another two parity errors for routine test of the parity logic of the function 308 in the terminal function 106, and the counter 330.

Two values forming the result of the parity check done by the parity check logic 312 in the switch terminating unit STU 108 are available, indicated by arrows 336 and 338, via the two signals PERR_LX and MFPEV mentioned earlier. The value of the signal PERR_LX indicates whether a parity fault has appeared and the value on the signal MFPEV indicates that the time slot MFPE_LX was present in frame zero.

Logic can be provided for combining these signals to establish the presence or not of a real fault. The values of the signals can e.g. be used by an operations and maintenance function, indicated at 340, that needs the parity result feedback from the switch terminating unit 108 for e.g. a fault stop supervision logic to prevent faulty data to be sent to the switch via the switch terminating unit 108.

As an example, the signal MFPEV can be forced to be high during one clock cycle when the signal PERR_LX presents the parity check result of the signal MFPE_LX in frame zero a few number of time slots after the time slot MFPE_LX has passed the signals of the switch terminal interface USTI. The 'fault stop' processor, or any equivalent terminal function, is using the signals to halt itself. The two signals can furthermore both be held low by the switch terminating unit STU when the switch terminal interface USTI frame LX is out of sync.

As described above, the signal MFPEV tells when a faulty parity should be found and the signal PERR_LX is the result of every parity check done in the switch terminating unit STU. If the routine test is working properly from the terminal function TF to the switch terminating unit STU the two signals should be high only once in every multiframe (every second).

If the signal MFPEV is high and the signal PERR_LX low or vice versa then a real fault is a fact (MFPEV 'exor' PERR_LX=parity fault in corresponding time slot in LX frame).

Figure 5:
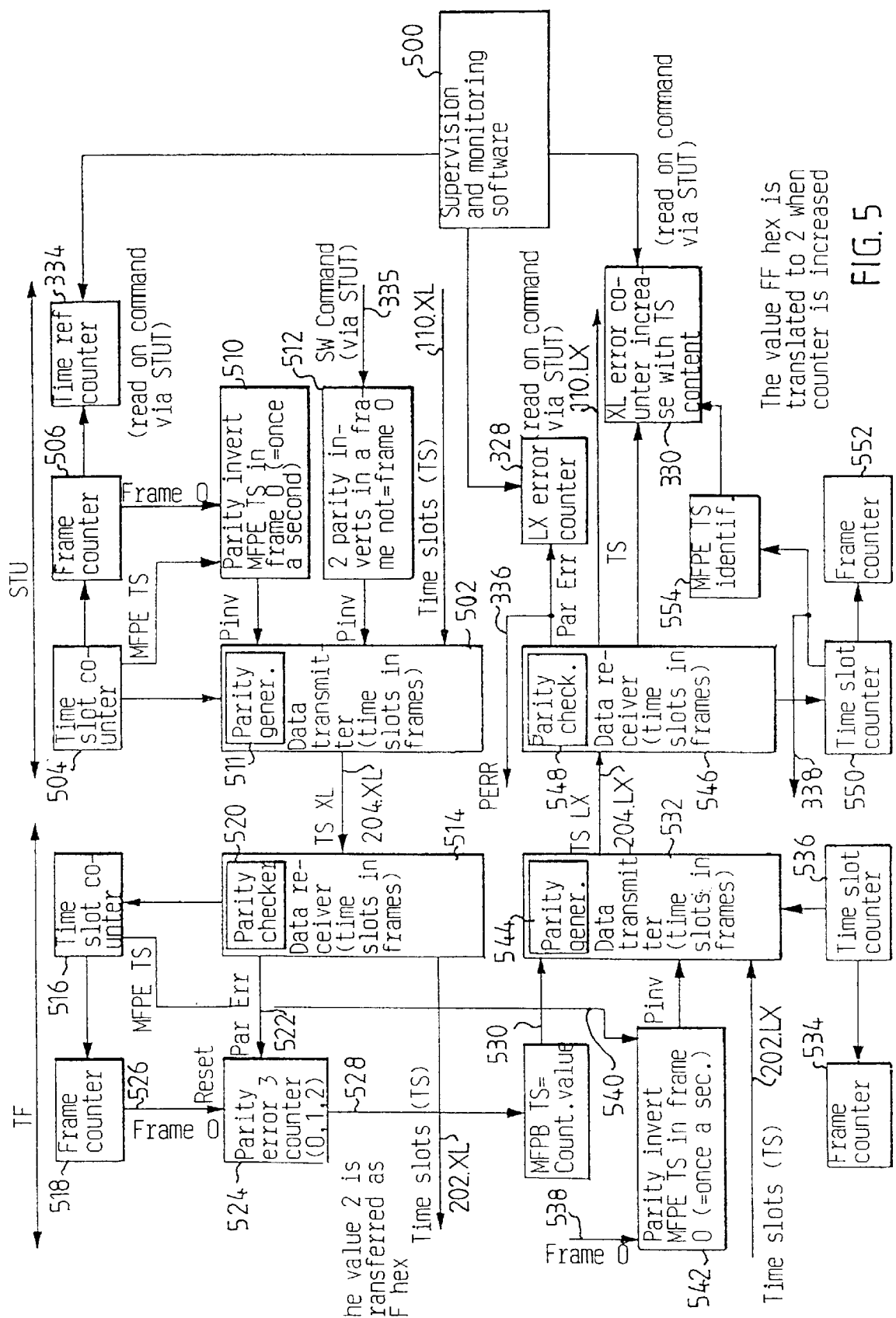
FIG. 5 is a block diagram illustrating in more detail the embodiment according to FIG. 3.

FIG. 5 is a block diagram illustrating in more detail an embodiment of the functions described generally above with reference to FIG. 3.

In FIG. 5 a block 500 indicates supervision and monitoring software which reads, via the STUT function 206, the time reference counter 334, LX error counter 328 and XL error counter 330, which are included in the STUT function 206, not shown in FIG. 5. The block 500 is also intended to represent the software, mentioned in connection with describing FIG. 3 earlier, for producing a result indicative of the number of parity faults received in test time slots MFPE_LX minus the expected number of faults in frames 0 and consisting of the numbers 0, 1 or 2 for zero, one or more parity faults, respectively.

Time slots in frames arriving to the switch terminating unit 108 from the switch core on the link 110.XL are received in a data transmitter 502 for the signals 204.XL. Among time slots received in frames on the link 110.XL, a time slot counter 504 indentifies time slots MFPE, and a frame counter 506, connected thereto, counts frames for identifying frames with the FRC value 0. The counters 504 and 506 are associated with the time reference counter 334 included in the STUT 206 and are set to zero on command via STUT 206 when read by the supervision and monitoring software 500.

Time slots MFPE in frames 0 thus identified by the counters 504 and 506 are inverted by an inverting function indicated by a block 510 and introduced in a parity generator 511 in the transmitter 502 to replace corresponding time slots in the flow 110.XL for transmission in the flow 204.XL. A block 512 indicates an inverting function for introducing, on command via the STUT as indicated by arrow 335, two parity errors in the flow 204.XL by inverting two time slots in another frame than frame 0, as has been explained earlier.

The flow 204.XL is received in the terminal function 106 by a data receiver 514 from which the data is transferred as data flow 202.XL in the user direction. To the data receiver 514 a time slot counter 516 and a frame counter 518 are connected for identifying time slots MFPE and frames 0, respectively, in the flow 204.XL. The data receiver 514 also contains parity check logic 520, included in the block 308 in FIG. 3, for producing the parity error number indicating result 0, 1 or 2 as described earlier. This result is transferred, indicated by arrow 522, to a parity error 3-counter 524 which is reset, indicated by arrow 526, by the frame 0 count from the frame counter 518. The counter values from the counter 524 are transferred, indicated by arrows 528 and 530, to a data transmitter 532.

The data transmitter 532 transmits, as controlled by a frame counter 534 and a time slot counter 536, time slots in frames received in flow 202.LX from the user direction as the flow 204.LX to the switch terminating unit 108. Time slots MFPE in frames 0 as identified by the counters 516 and 518 are transferred, indicated by arrows 538 and 540, to an inverting function indicated by a block 542, and introduced in a parity generator 544 in the transmitter 532 to replace corresponding time slots in the flow 202.LX for transmission in the flow 204.LX. Each count value from the counter 524 received as indicated by arrows 528 and 530 in the data transmitter 532, is introduced in first available time slot MFPE_LX in the parity supervised flow 204.LX as has been described with reference to FIGS. 3 and 4.

The flow 204.LX is received in a data receiver 546 for further transfer in the switch direction as flow 110.LX. The data receiver 546 comprises a parity checker 548, in which every time slot in the LX direction is checked for parity error, the result being the parity signal PERR_LX which is available on line 336 and transferred to the LX error counter 328, as described earlier in connection with FIG. 3.

The flow 110.LX passes the XL error counter 330. A time slot counter 550 and a frame counter 552 are connected to a MFPE time slot identifier 554 the output of which is used to control the counter 330 to be increased with the number of faults having occurred in the XL direction, as described earlier with reference to FIGS. 3 and 4. MFPEV is available on line 338 as described earlier.

The counters 328 and 330 are set to zero when read by the supervision and monitoring software 500.

As seen from another point of view the systems described above can be characterized as forming a method and a system for detecting faults in fault detecting hardware designed to detect faults in the data flows 204.XL and 204.LX.

The method resides in introducing a known background load of faults, i.e. the parity faults, in the data flows, detecting actual background load of faults by means of the functions 308 and 312, and detecting a difference between the known and actual loads of faults by means of the software 500.

The system comprises the fault generating means 302, 510, 512 for deliberately introducing faults in the data flow before it reaches the fault detecting hardware to obtain a known background load of faults in the data flow, the fault counting means 328, 330, 334 for counting actual faults including the deliberately introduced faults for detecting actual background load of faults, and the software means 500 for detecting a difference between the known and actual loads of faults.

Two further embodiments of methods and systems of a similar kind will be described below with reference to FIGS. 6 and 7.

Figure 6:
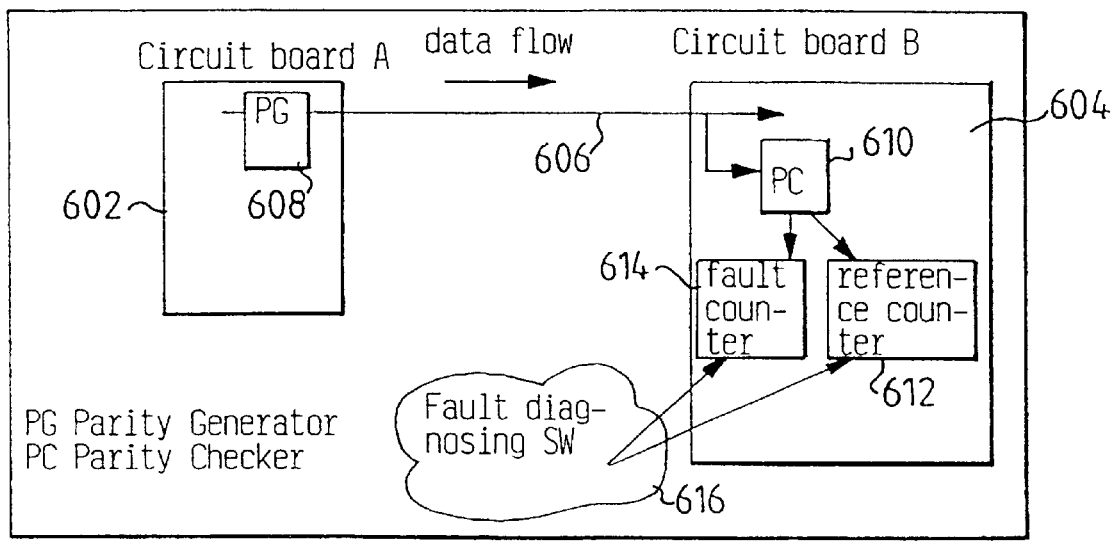
FIG. 6 is a block diagram schematically illustrating a second embodiment of routine test of maintenance hardware.

FIG. 6 shows two circuit boards 602 and 604 that are connected via a physical link 606 which carries a data flow from the board 602 to the board 604. The transmitting board 602 comprises a parity generator 608 that calculates parity on every data word sent on the link, and the receiving board 604 comprises a parity checker 610 which checks this parity. A reference counter 612 is incremented every time the parity is checked. If a parity error is detected, a fault counter 614 is incremented. The parity generator 608 generates an incorrect parity at regular intervals (e.g. 1/sec) to cause a background load of faults to occur in the fault counter. The counters are cleared when read. Software 616 is connected to read the counters 612 and 614 at regular intervals, e.g. once every 5 minutes for determining the ratio between the respective counts. If this ratio is found to differ from that expected, i.e. the normal 'background load' of faults, then this indicates a faulty state somewhere between the priority generator 608 and the counters 612 and 614.

A variation of the above example is to have the hardware to generate faults autonomously.

Another variation is to have the parity generator controlled by software, i.e. a faulty parity is generated by command from the software, which then can be handled as 'background load' by the software.

It is also possible to combine these variations as has been described earlier with reference to FIGS. 3 and 5.

Figure 7:
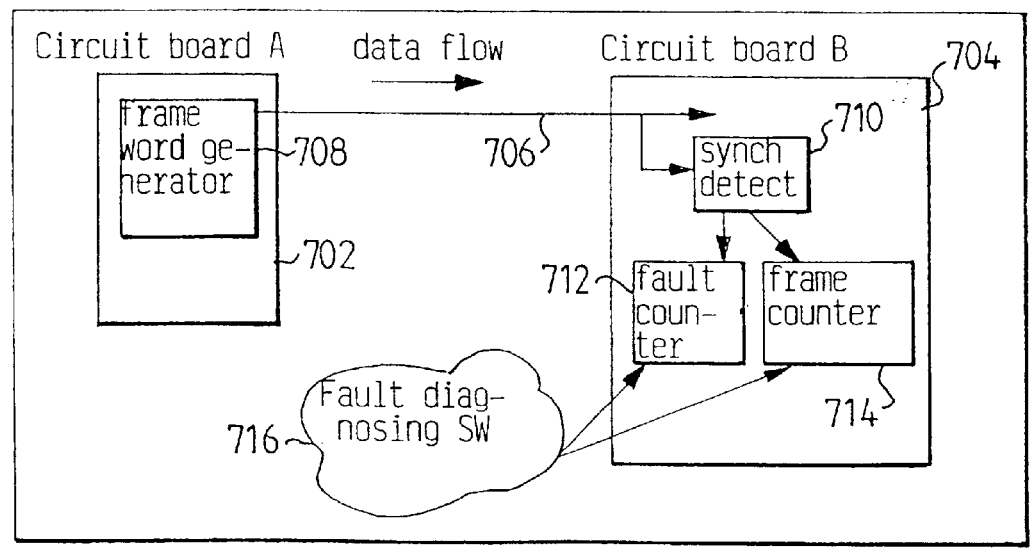
FIG. 7 is a block diagram schematically illustrating a third embodiment of routine test of maintenance hardware.

In FIG. 7 two circuit boards 702 and 704 are interconnected by a synchronous serial link 706, on which data is sent in frames of fixed length and the frames are delimited by frame words. The frame words are generated by a frame word generator 708 of the transmitting board 702. The receiving board 704 comprises a synchronization detector 710 for detecting appearance of the frame word in the data flow on the link 706. If the frame word appears in the same position of time a determined number of times, the link is considered to be synchronized. If the frame word disappears a number of times, e.g. more than three times, as counted by a fault counter 712, the link is considered to be out of synchronism.

To be able to test this mechanism, the frame word generator is designed to generate one incorrect frame word periodically, i.e. one incorrect frame word for a number of frames, e.g. 10000 frames, counted by a frame counter 714, this incorrect word being detected in the fault counter 712. This will, however not make the link 706 to lose synchronism, since it is just one lost frame word. Software 716 reads the fault counter 712 and the frame counter 714, to check that the synch detector 710 can detect lost frame words.

Advantages of the invention are that it allows testing of all hardware in a system, including fault detection hardware, and that tests can be done in a non intrusive way, i.e. without disturbing normal operation.

What is claimed is:

1. A switch terminal unit for a TS switch, said switch terminal unit comprising a terminal function forming a user part of the terminal unit, and a switch terminating unit forming a switch port, where there is a bidirectional transfer of signals, including parity supervised signals, between the terminal function and the switch terminating unit, said signals being organized in frames containing a number of time slots, first parity fault generating means in the switch terminating unit for generating in a test time slot, included in said number of time slots and intended for parity function routine tests, a parity fault in a determined one of the frames sent to the terminal function, for producing an expected number of faults in said frames, and second parity fault generating means in the terminal function for generating a parity fault in said test time slot in a determined one of the frames sent to the switch terminating unit, for producing an expected number of faults in said frames, the terminal function further comprising a first time slot counting means for counting time slots with a parity error in the frames received from the switch terminating unit, and producing a result for each frame indicative of the number of parity errors in that frame, and means for inserting each result indicative of the number of parity errors in a first available one of the test time slots in the frames sent to the switch terminating unit, the switch terminating unit further comprising second time slot counting means for counting time slots with a parity error in the frames received from the terminal function and producing a result for each frame indicative of the number of parity errors for that frame, parity fault monitoring means for receiving the result produced by the first time slot counting means and transferred in the test time slot, and further receiving the result from the second time slot counting means indicative of test time slots appearing in the determined frame, and software means associated with the monitoring means for producing a result indicative of the number of parity faults received in test time slots minus the expected number of faults in the determined frames.

2. The switch terminal unit according to claim 1, in which said results produced by said first and second time slot counting means are number values which are each indicative of some respective number of time slots with parity error, and are used for incrementing two parity supervision counters with the respective values, one of said counters being associated with each of said time slot counting means.

3. The switch terminal unit according to claim 1, in which said parity fault is generated by inverting the parity of the test time slot.

4. The switch terminal unit according to claim 1, in which another two parity faults are ordered in the switch terminating unit in another frame than the determined frame for the purpose of testing counters.

5. The switch terminal unit according to claim 1, further comprising means for providing two signals representing the result of the parity check done by the second time slot counting means, one of said two signals indicating whether a parity fault has appeared in a test time slot, and the other of said two signals indicating whether the test time slot was present in the determined frame, and logic for combining these signals to establish the presence or not of a real fault.

6. The switch terminal unit according to claim 5, in which said logic is used by fault stop supervision logic to prevent faulty data from being sent to the switch via the switch terminating unit.

7. A system for detecting faults in fault detecting hardware designed to detect faults in a data flow, comprising
    fault generating means for deliberately introducing faults in the data flow before it reaches the fault detecting hardware to establish a known background load of faults in the data flow,
    fault counting means for counting actual faults, including the deliberately introduced faults, for detecting actual background load of faults, and
    software means for analyzing a difference between the known and actual loads of faults.

8. The system according to claim 7, for detecting faults in fault detecting hardware located on both sides of a bidirectional data flow, in which the fault generating means are located on both sides of the data flow, and the fault counting means and the software means are located on one and the same side of the data flow.

9. The system according to claim 8, wherein the bidirectional data flow includes parity supervised signals between first and second data transmitting and receiving functions, said signals being organized in frames containing a number of time slots,
    the first data transmitting and receiving function comprising first parity fault generating means for generating in a test time slot, included in said number of time slots and intended for parity function routine tests, a parity fault in a determined one of the frames sent to the second data transmitting and receiving function, for producing an expected number of faults in said frames,
    the second data transmitting and receiving function comprising
        second parity fault generating means for generating a parity fault in said test time slot in a determined one of the frames sent to the first data transmitting and receiving function, for producing an expected number of faults in said frames,
        first time slot counting means for counting time slots with parity error in the frames received from the first data transmitting and receiving function and producing a result for each frame indicative of the number of parity errors of that frame, and
        means for inserting said result indicative of the number of parity errors in a first available one of the test time slots in the frames sent to the first data transmitting and receiving function, and
    the first data transmitting and receiving function further comprising
        second time slot counting means for counting time slots with parity error in the frames received from the second data transmitting and receiving function and producing a result for each frame indicative of the number of parity errors for that frame,
        parity fault monitoring means receiving the result produced by the first time slot counting means and transferred in the test time slot, and further receiving the result from the second time slot counting means indicative of test time slots with parity errors appearing in the determined frame, and
        software means associated with the monitoring means for producing a result indicative of the number of parity faults received in test time slots minus the expected number of faults in the determined frames sent to the second data transmitting and receiving means.

10. The system according to claim 7, in which the fault generating means is a parity generator calculating parity on every data word sent from one side of the link and generating an incorrect parity at regular intervals to establish the background load, the fault detecting hardware is a parity checking mean, and the fault counting means comprises a fault counter and a reference counter, the reference counter being incremented every time parity is checked and the fault counter being incremented when a parity error is detected, the software means reading the counters at regular intervals and analyzing the ratio of faults between the fault counter and the reference counter.

11. The system according to claim 7, in which the data flow contains frames of fixed length and delimited by frame words, the fault generating means is a frame word generator generating an incorrect frame word periodically, the fault detecting hardware is a synchronization detector, and the fault counting means comprises a fault counter and a frame counter, the fault counter being connected to the synchronization detector for counting number of faulty frame words and the frame counter being connected to the synchronization detector for counting frames, the software means reading the counters and analyzing whether or not the synchronization detector can detect lost frame words.

12. The system according to claim 9, wherein the hardware generates faults autonomously.

13. The system according to claim 9, wherein software commands introduction of faults in the hardware.

* * * * *

UNITED STATES PATENT AND TRADEMARK OFFICE
Certificate

Patent No. 6,373,819 B1

Patented: April 16, 2002

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Peter Carl Birger Lundh, Skärholmen, Sweden; and Arto Nummelin, Alvsjo, Sweden.

Signed and Sealed this Thirteenth Day of January 2004.

HUY D. VU
*Supervisory Patent Examiner*
*Art Unit 2665*